US010117379B2

(12) United States Patent
Guiet et al.

(10) Patent No.: US 10,117,379 B2
(45) Date of Patent: Nov. 6, 2018

(54) BLADE ROTOR OF A CUTTER BAR FOR A MOWING DEVICE

(71) Applicant: DEERE & COMPANY, Moline, IL (US)

(72) Inventors: Lionel Guiet, Gray (FR); Pierre Dommange, Arc-les-Gray (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/214,626

(22) Filed: Jul. 20, 2016

(65) Prior Publication Data

US 2017/0020063 A1  Jan. 26, 2017

(30) Foreign Application Priority Data

Jul. 24, 2015 (DE) .................. 10 2015 214 051

(51) Int. Cl.
*A01D 34/00* (2006.01)
*A01D 34/73* (2006.01)
*A01D 34/66* (2006.01)
*A01D 101/00* (2006.01)

(52) U.S. Cl.
CPC .......... *A01D 34/003* (2013.01); *A01D 34/664* (2013.01); *A01D 34/733* (2013.01); *A01D 34/736* (2013.01); *A01D 2101/00* (2013.01)

(58) Field of Classification Search
CPC .... A01D 34/664; A01D 34/736; A01D 34/66; A01D 34/667; A01D 34/668; A01D 34/733
See application file for complete search history.

(56) References Cited

U.S. PATENT DOCUMENTS

| 3,979,889 A | * | 9/1976 | Vansteelant | A01D 34/664 56/192 |
| 4,426,828 A | * | 1/1984 | Neuerburg | A01D 34/664 56/13.6 |
| 4,633,656 A | * | 1/1987 | Willinger | A01D 34/664 56/13.6 |
| 4,662,159 A | * | 5/1987 | Muller | A01D 34/664 56/13.6 |
| 5,842,330 A | * | 12/1998 | Richardson | A01D 34/667 56/13.6 |

(Continued)

FOREIGN PATENT DOCUMENTS

| EP | 0210685 A1 * | 2/1987 | .......... A01D 34/736 |
| EP | 2497353 A1 | 9/2012 | |

OTHER PUBLICATIONS

European Search Report in foreign counterpart application No. 16179716.2, dated Dec. 21, 2016 (7 pages).

*Primary Examiner* — Arpad Fabian-Kovacs

(57) ABSTRACT

A blade rotor includes a mowing disc, at least one mowing blade, at least one bearing pin mounted on the mowing disc for the pivoting support of the mowing blade, a spring plate arranged on a bottom side of the mowing disc for holding the mowing blade on the bearing pin, and at least one scraper for removing residue stuck on the cutter bar, wherein the scraper is arranged between the spring plate and the bottom side of the mowing disc and is mounted detachably on the mowing disc between the bearing pin and an axis of rotation of the mowing disc.

10 Claims, 6 Drawing Sheets

(56) References Cited

U.S. PATENT DOCUMENTS

| | | | |
|---|---|---|---|
| 6,311,463 B1 * | 11/2001 | Mellin | A01D 34/736 56/13.6 |
| 6,829,878 B1 | 12/2004 | Hoffman | |
| 7,647,758 B1 * | 1/2010 | Bandi | A01D 34/668 56/295 |

* cited by examiner

BLADE ROTOR OF A CUTTER BAR FOR A MOWING DEVICE

CROSS-REFERENCE TO RELATED APPLICATIONS

Pursuant to 35 USC § 119, this application claims the benefit of and priority to German patent application no. 102015214051.2, filed on Jul. 24, 2015, which is herein incorporated by reference in its entirety.

FIELD OF THE DISCLOSURE

The disclosure relates to a blade rotor of a cutter bar of a mowing device, including a mowing disc, at least one mowing blade, at least one bearing pin mounted on the mowing disc for the pivoting support of the mowing blade, a spring plate arranged on a bottom side of the mowing disc for holding the mowing blade on the bearing pin, and at least one scraper for removing residue stuck on the cutter bar.

BACKGROUND

Mowing devices are known and are used, among other things, in agriculture to cut stalk stock or stalk-like harvested produce and to lay it on the ground in a swath for pick-up, for example, by a baler. The mowing devices can be constructed as disc mowers and have multiple blade rotors that are arranged one next to the other on a so-called cutter bar. The blade rotors have rotating, oval-shaped mowing discs, on whose long ends, mowing blades are arranged so that they can pivot on the bearing pin. The mowing blades are held so that they can pivot on a bearing shaft constructed on the bearing pin between a spring plate and the mowing discs, wherein the spring plate is in spring-mounted engagement with one end of the bearing pin and this locks on the bearing pin for securing the mowing blade. The bearing pin is typically supported in a mounting hole constructed on the mowing disc and is guided on a side of the mowing disc facing the spring plate through the mounting hole and screwed to a side of the mowing disc facing away from the spring plate with a screw nut. If a mowing blade becomes damaged or worn, the spring plate can be detached from the bearing pin end with a clamping tool, which creates a limited installation space that makes possible the quick removal of the mowing blade from the bearing shaft. While mowing harvested produce, residue constantly accumulates underneath the mowing disc and sticks to the surface of the cutter bar. This can negatively influence the rotational motion of the mowing discs, the discharge of cut produce, and the cutting quality of the mowing blades, so that precautionary measures must be taken to prevent this build-up. Such precautionary measures include, for example, so-called scrapers or skimmers that are arranged between the cutter bar and mowing disc and rotate together with the mowing disc over the surface of the cutter bar. In this way, mowed produce or other residue building up on the surface of the cutter bar is scraped or stripped away from the surface of the cutter bar and the cutter bar is kept clean or is cleared. It is unavoidable that such scrapers or skimmers are subject to a certain amount of wear and thus must be replaced after a given amount of time. Until then, the scrapers or skimmers undergo continuous wear and tear such that the cleaning effect also decreases continuously. Such scrapers or skimmers are constructed as connecting pieces that extend from the mowing disc to the surface of the cutter bar and are, for example, welded or connected non-detachably in some other way, in particular, to the mowing disc. Replacing the scraper is therefore usually complicated and intensive in terms of costs and time and cannot be performed independent of the mowing disc, so that the material selection is also restricted. Furthermore, an adjustment or calibration or even the use of different scrapers for different types or conditions of harvested produce is also usually not possible without replacing the mowing discs as a whole.

SUMMARY

The task that forms the basis of the disclosure is to disclose a blade rotor of the type mentioned above by means of which the problems mentioned above are solved.

The task is achieved according to the disclosure by the teaching of claim 1. Other advantageous constructions and developments of the disclosure emerge from the dependent claims.

A blade rotor of the type named above is disclosed, wherein the scraper is arranged between the spring plate and the bottom side of the mowing disc and is detachably mounted on the mowing disc between the bearing pin and an axis of rotation of the mowing disc. The scraper thus can be detached and replaced independent of the mowing disc without having to remove or replace the mowing disc itself. Furthermore, through the arrangement of the scraper between the mowing disc and the spring plate, a simple pre-adjustment is given, so that the scraper is pressed by the spring plate against the bottom side of the mowing disc and is brought virtually into a predetermined seating, so that, in particular, the orientation of the scraper and the correct seating are also produced. The ability to detach the scraper independently from the mowing disc makes possible, on one hand, quick maintenance and installation work and avoids, on the other hand, having to replace the entire mowing disc. Furthermore, it is possible to adapt the height of the scraper in a simple way by placing, for example, a shim or other type of spacer between the mowing disc and scraper. In this way, the same scraper can be readjusted and reused even after a certain amount of wear and tear. Through the individual arrangement of the scraper on the mowing disc, an independent direction of rotation of the mowing disc on the cutter bar is also given, because the scraper can be arranged or oriented according to the desired direction of rotation. Thus, one and the same mowing disc can be used both with right-hand and also left-hand rotation. For scrapers connected to the mowing disc, a distinction must always be made between right-hand and left-hand rotating mowing discs with scrapers arranged and oriented accordingly on the mowing disc. Finally, the material can also be selected independent of the mowing disc, because, for example, a welded connection and a corresponding suitability for this welded connection can be eliminated, so that depending on the selection, highly wear-resistant material or even especially economical material can be used for the scraper, without having to consider suitability for welding.

The scraper has a fastening plate and a scraper finger extending from there essentially radial to the axis of rotation of the mowing disc (vertical axis) and parallel to the surface of the cutter bar with a scraper edge. The scraper finger is oriented so that it traverses or describes a circular ring-shaped surface with its scraper edge on the surface of the mowing disc and frees this surface of residue or harvested produce stuck to this surface. The fastening plate and the scraper finger can have a one-piece construction, for example, as a monocast part or also as a shaped or forged part. The scraper could also have a two-piece construction, so that the fastening plate and the scraper finger can have different materials with different material properties (deformability, material hardness, wear strength, etc.). For example, the fastening plate can be made from economical metal or even plastic, and the part of the scraper subjected to wear, namely the scraper finger, can be made from a wear-resistant material, for example, from hardened metal, and can be pressed into the plastic or in some other way connected to the plastic. It is also conceivable that the scraper finger can be screwed to the fastening plate, so that if the scraper has wear, only the scraper finger must be replaced. In connection with a two-piece construction of the scraper, it is also conceivable to produce scraper fingers of different geometries and shapes, in particular with constructions that are different in height and length, so that, depending on the application requirements, scraper fingers with optional heights (height=axial extent of the scraper finger in the vertical direction to the cutter bar) and lengths (length=radial extent in the plane of rotation of the mowing disc) can be screwed to the fastening plate.

The radial extent of the scraper finger is in the plane of rotation of the mowing disc, wherein the radial direction of the scraper finger is at an angle offset relative to the mowing blade (measured on the direction of the extent of the mowing blade with a rotating mowing disc). Depending on the direction of rotation of the mowing disc, the angle relative to the mowing blade is arranged to the left or the right with respect to the mowing blade.

The scraper can be mounted by means of a threaded connection that is accessible from the top side of the mowing disc, wherein at least one threaded bolt is provided that extends through a passage hole formed on the mowing disc and can be brought into connection with the fastening plate of the scraper. Thus, for example, two or more threaded bolts can be provided that extend through corresponding passage holes on the mowing disc and project into the fastening plate arranged under the mowing disc and are turned in corresponding screw threads formed there or are connected with screw nuts arranged on the fastening plate. It is also conceivable to provide a plug-in connection instead of a threaded connection, for example, with a click-in or latching connection.

Pockets that are used to form an attachment fit for a clamping tool that can be attached for changing the mowing blade are provided on the fastening plate for both sides of the bearing pin.

Furthermore, a clamping tool for replacing a mowing blade can be provided. The clamping tool is formed, for example, in the form of a lever arm with fork head and has two fork legs that are spaced apart from each other and can be placed or pushed between the mowing disc and spring plate. Simultaneously, it can be brought into engagement in this way with the pockets of the scraper. The fork legs of the lever arm are arranged at a distance to each other that is adapted to the pockets formed on the fastening plate. Now if the clamping tool is attached, that is, if the fork legs are each pushed on one side of the mowing blade between the mowing disc and the spring plate, then the pockets are used, on one hand, as a stop for the fork leg ends and, on the other hand, as a lateral guide of the fork legs against lateral slippage. The fork legs are bent further upward in the vertical direction (with respect to a horizontally oriented lever arm) such that for fork legs contacting the spring plate, by moving the lever arm downward, the fork leg ends are pressed upward against the bottom side of the mowing disc and simultaneously a fork leg contact surface is moved in the direction of the spring plate. In this way, the distance between the mowing disc and spring plate is increased, so that the mowing blade is released from the bearing pin or from the spring plate.

The construction of a blade rotor shown above is suitable, in particular, for use in mowing devices with blade rotors in the form of mowing discs, mowing plates, or also mowing drums that can be constructed with or without conditioning units.

With reference to the drawing that shows an embodiment of the disclosure, the disclosure and additional advantages and advantageous developments and constructions of the disclosure will be described and explained in more detail below.

BRIEF DESCRIPTION OF THE DRAWINGS

Shown are.

DETAILED DESCRIPTION

Figure 1:
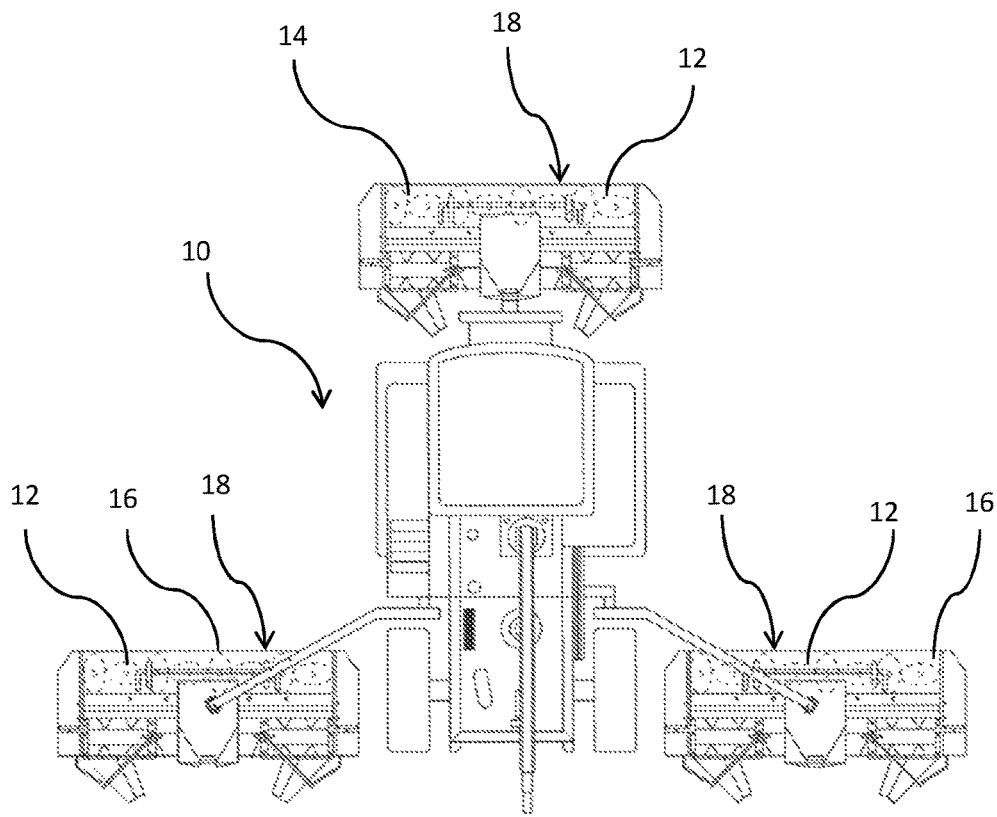
FIG. 1, a schematic plan view of an agricultural vehicle with a mowing device, FIG. 2, a perspective top-side view of a cutter bar with blade rotor of the mowing device from FIG. 1, FIG. 3, a perspective side view of a part of the cutter bar with blade rotors from FIG. 2, FIG. 4, a partial exploded view of the side view of the cutter bar with blade rotors from FIG. 3, FIG. 5, a bottom-side perspective view of a scraper from FIG. 4, FIG. 6, a top-side, perspective view of the scraper from FIGS. 4 and 5, and FIG. 7, a perspective side view of a part of the cutter bar with blade rotors from FIG. 2 and a mounted clamping tool for changing the mowing blade.

The agricultural vehicle 10 shown in FIG. 1 is a self-propelled mowing machine with mowing devices 12 in the form of a front mowing tool 14 and side rear mowing tools 16. The vehicle 10 constructed here as a self-propelled unit, however, is used only as an example and could also be constructed as an agricultural tractor and could be equipped with mowing devices 12 constructed accordingly as attachments or trailing units.

Figure 2:
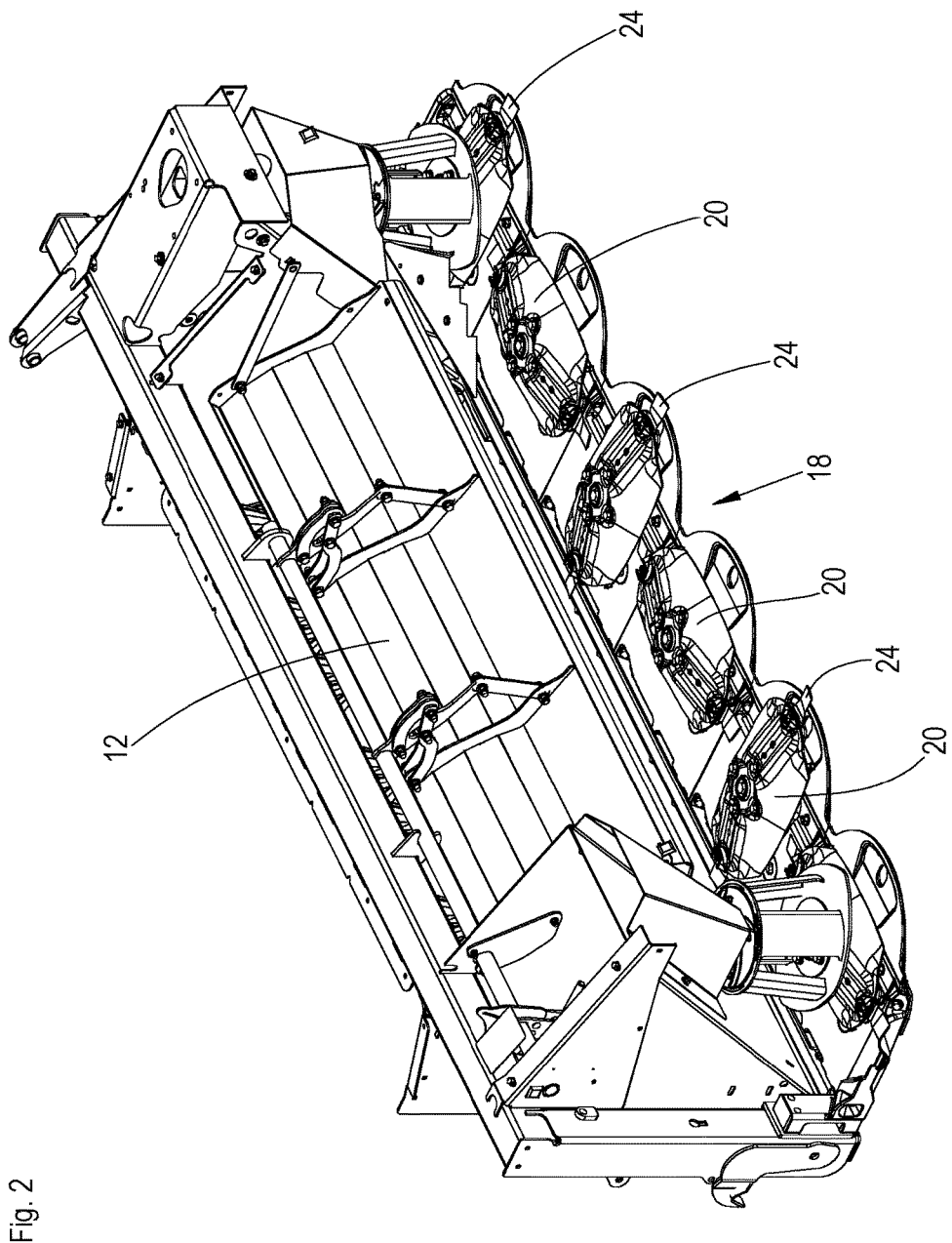
Figure 3:
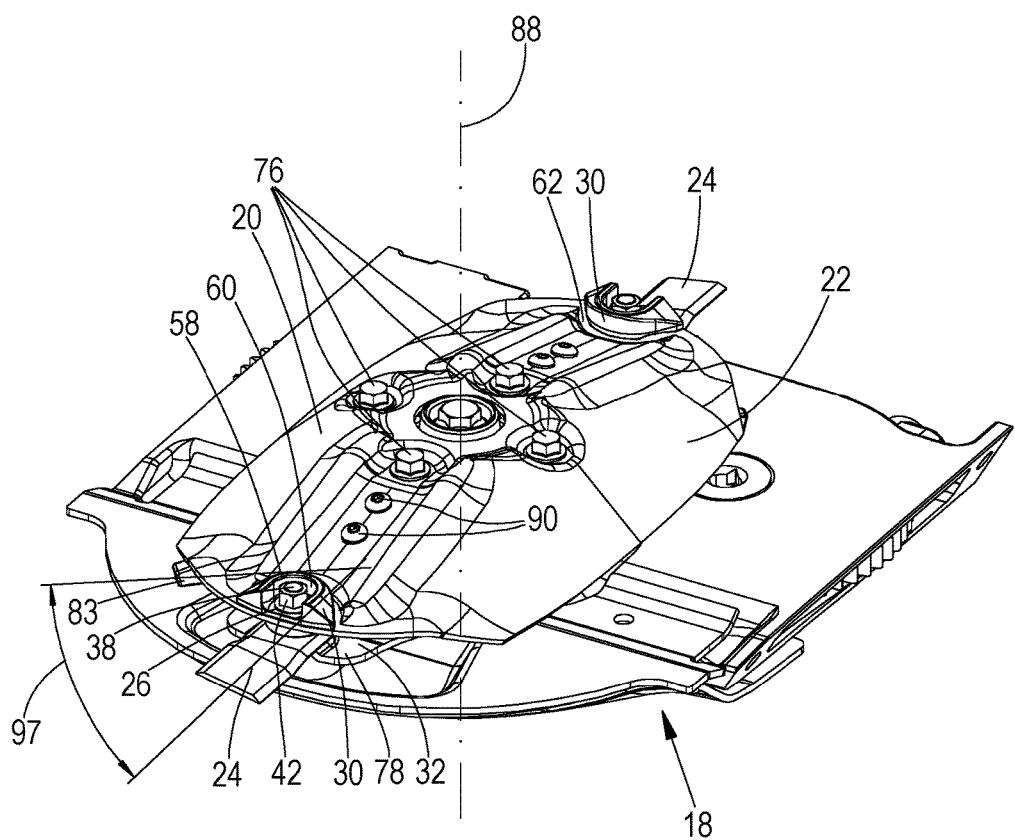
Figure 4:
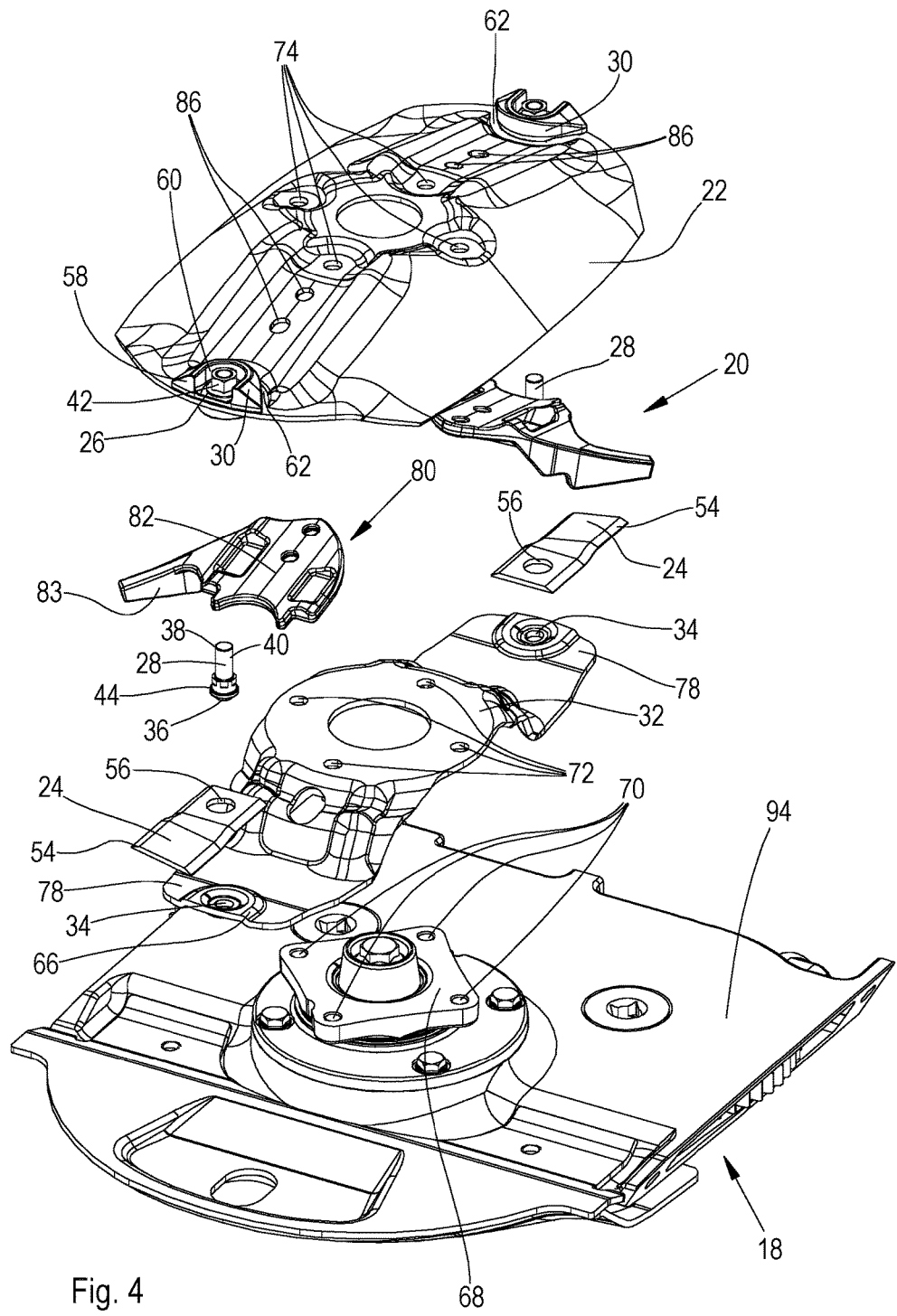

As shown in more detail in FIGS. 2 to 4, a mowing device 12 includes a cutter bar 18 with multiple blade rotors 20 mounted on this cutter bar and driven to rotate (only one is shown here).

The blade rotor 20 includes a mowing disc 22 with mowing blades 24 mounted on this disc so that they can pivot. The mowing disc 22 has an oval shape in this embodiment, wherein the mowing blades 24 are arranged on the long ends of the oval. The blade rotor 20 constructed in this embodiment with a mowing disc 22 could also be constructed in a known way with a drum or plate shape (cutting drum, cutting plate). It should be noted that, in FIGS. 2 to 4, the upward pointing side of the mowing disc 22 is the side on the mowing device 12 pointing away from the ground to be worked. It is also a side of the mowing disc 22 accessible to the operator for installation purposes. In the description below, this side is designated as the top side of the mowing disc 22 and the opposite side of the mowing disc 22 is designated as the bottom side.

The mowing blades 24 are suspended or supported on the mowing discs 22 so that they can pivot by means of a mounting hole 26 constructed on the mowing disc 22 and a bearing pin 28 attached thereto. The mounting hole 26 is formed on a wear protection device 30 constructed on the mowing disc 22 for protecting the bearing pin 28 or for protecting the mounting hole 26 and for mounting the bearing pin 28 on the mowing disc.

For holding and quickly installing a mowing blade 24, on the bottom side of the mowing disc 22 there is a spring plate 32 that extends starting from the middle of the mowing disc 22 to the ends of the mowing disc 22. At the end areas of the spring plate 32 there is a holding hole 34 that is in engagement with the bearing pin 28 such that one end 36 of the bearing pin 28 is held or clamped in the holding hole 34.

The bearing pin 28 includes a threaded shaft 38 and a holding shaft 40 adjacent to this threaded shaft. With a screw nut 42, the bearing pin 28 is mounted on its threaded shaft 38 on the mounting hole. Furthermore, the bearing pin 28 includes a bearing shaft 44 adjacent to the holding shaft 40 for the mowing blade 24. The diameter at the end 36 of the bearing pin 28 is dimensioned such that the end 36 can be introduced into the holding hole 34. The diameter of the holding hole 34 on the spring plate 32 is dimensioned such that the spring plate at the edge of the holding hole 34 can come into contact with a section at the end 36 of the bearing pin.

The mowing blade 24 has, on an end opposite a mowing blade edge 54, a bearing hole 56 whose diameter is dimensioned such that it can be guided over the bearing shaft 44 of the bearing pin 28.

As is to be seen in FIGS. 3 and 4, the wear protection device 30 has a U-shaped collar 58 with a collar shaft 60 that projects beyond the screw nut 42 and encloses this screw nut for the most part, wherein the U-shaped collar 58 is open on one side. On the top side of the mowing disc 22 there is, in the area of the mounting hole 26, a pocket 62 surrounding the mounting hole 26.

Furthermore, a holding bead 66 surrounding the holding hole 34 and extending in the direction of the mowing blade 24 or the mowing disc 22 is formed on the spring plate 32. The holding bead 66 is formed such that the mowing blade 24 can form a contact on its bottom side on an edge area surrounding the bearing hole 56 on the holding bead 66, so that the mowing blade 24 is held at the height of the bearing shaft 44.

According to all of these arrangements, an installation of the beating pin 28 on the mowing disc 22 for the pivoting support of the mowing blade 24 is realized as follows: the bearing pin 28 is guided, with its threaded area 38 at the front, out from the bottom side of the mowing disc 22 through the mounting hole 26 and fixed by means of the screw nut 42. The end 36 of the bearing pin 28 is moved into the holding hole 34 of the spring plate 32, wherein the mowing blade 24 has already been guided onto the bearing shaft 44. When the bearing pin 28 is mounted, this now projects into the holding hole 34 of the spring plate 32, whereby the end 36 of the bearing pin 28 is blocked and the mowing blade is enclosed between the spring plate 32 and holding shaft 40. The bearing pin 28 is now mounted on the mowing disc 22 such that the bearing shaft 44 extends, starting from the mounting hole 26, in the direction of the bottom side of the mowing disc 22 and projects with its end 36 into the holding hole 34 of the spring plate 32. The mowing blade 24 is here held by the holding bead 66 on the spring plate 32 at the height of the bearing shaft 44. When the blade rotor 20 is started up, the mowing blade 24 can move unimpaired into the complete bearing seat due to the resulting centrifugal forces and can pivot about the bearing shaft 44. A pivoting support of the mowing blade 24 on the bearing shaft 44 is used to allow the mowing blade 24 to perform a certain amount of evasive maneuvers during mowing work if it strikes an obstacle, for example, a stone.

The cutter bar 18 is further constructed with a rotor flange 68 on which the spring plate 32 and the mowing disc 22 can be mounted, wherein threaded holes 70 are formed on the rotor flange 68 and corresponding mounting holes 72, 74 are formed on the spring plate 32 and mowing disc 22. By means of the threaded bolt 76, the mowing disc 22 and the spring plate 32 are mounted on the rotor flange 68, wherein the spring plate 32 is clamped between the rotor flange 68 and the mowing disc 22. The spring plate 32 is here formed and constructed such that free spring plate ends 78 extend toward the long ends of the oval of the mowing disc 22, wherein the mowing blade 24 is between the spring plate ends 78 and the bottom side of the mowing disc 22 and the spring plate ends 78 exert a spring force acting in the direction of the bottom side of the mowing disc 22.

Figure 5:
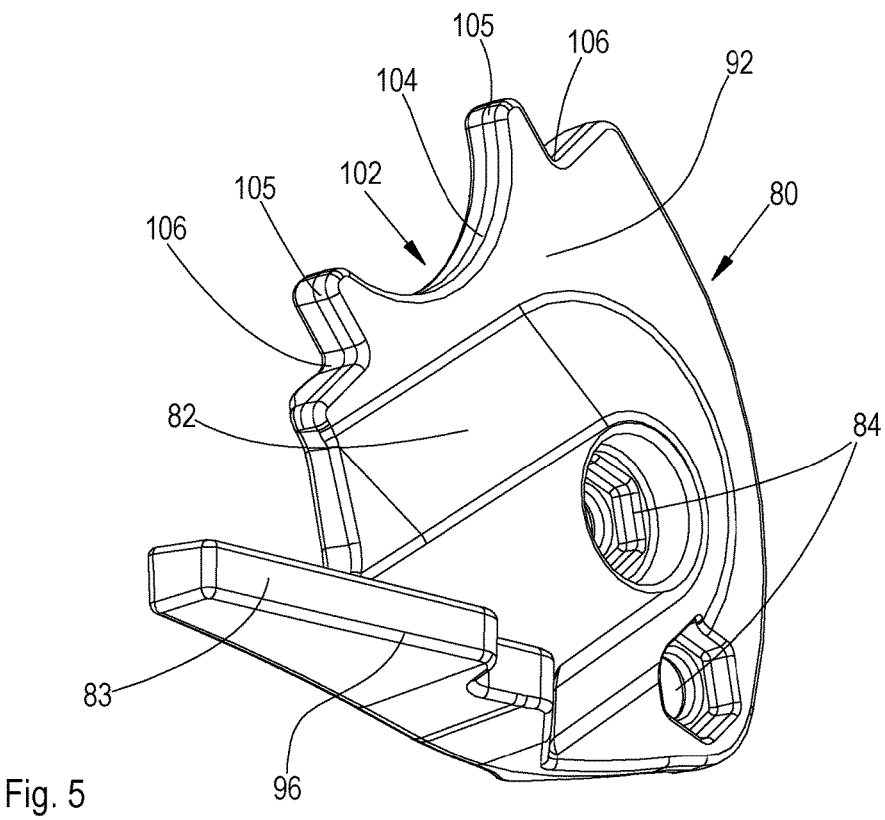
Figure 6:
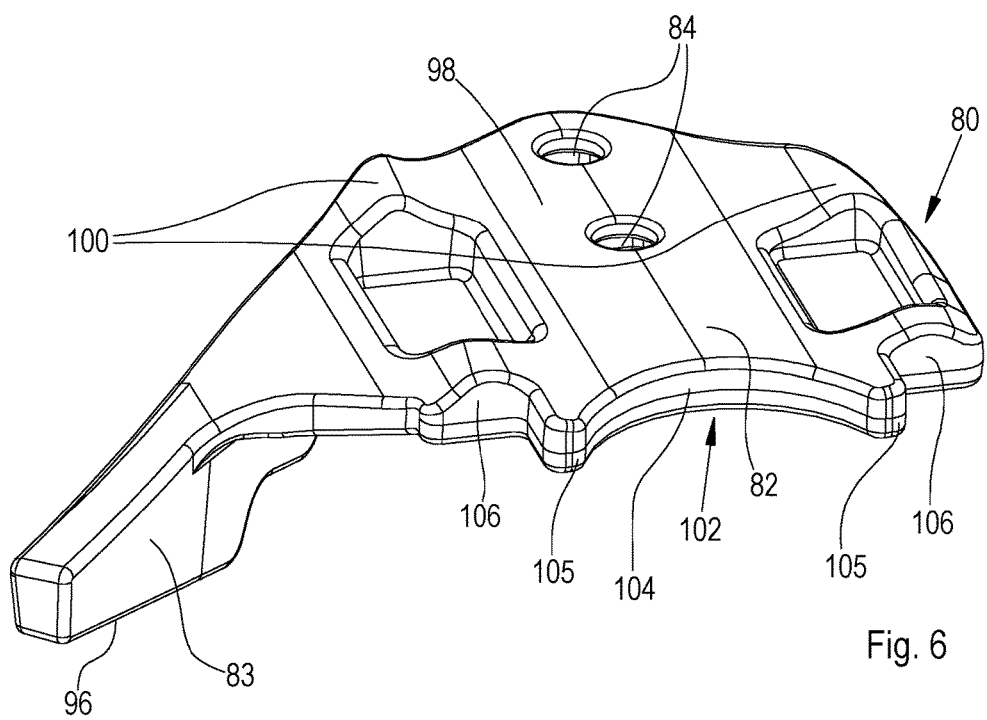

Between the free spring plate ends 78 and the mowing disc 22 there is, on both long ends of the oval of the mowing disc 22, a scraper 80 that includes a fastening plate 82 and a scraper finger 83. The scraper 80 is shown in detail in FIGS. 5 and 6. The fastening plate 82 has mounting holes 84 that correspond to mounting holes 86 arranged on the mowing disc 22, wherein the fastening plate 82 is mounted on the mowing disc 22 between the bearing pin 28 and an axis of rotation 88 of the mowing disc 22 by means of screws 90 and screw nuts (not shown). The scraper 80 is constructed such that, for the scraper 80 mounted on the mowing disc 22, the scraper finger 83 is formed by an elongated connecting piece that extends along a spring plate end 78 in its longitudinal direction from the fastening plate 82, essentially parallel to the plane of extent of the fastening plate 82 in the direction of the outside of the mowing disc 22, and projects past the edge of the long end of the oval of the mowing disc 22. Furthermore, the scraper finger 83 extends, starting from a bottom side 92 of the fastening plate 82, in the direction of a top side 94 of the cutter bar 18, so that, on the scraper finger 83 directly above the cutter bar 18, a scraping edge 96 is formed that defines, when the mowing disc 22 rotates, a circular ring surface projected onto the top side 96 of the cutter bar 18. A radial extent of the scraper finger 83 is in the plane of rotation of the mowing disc 22, radial to the axis of rotation 88, wherein the radial direction of the scraper finger is at an angle 97 offset with respect to the mowing blade 24 (measured in the direction of extent of the mowing blade 24 for a rotating mowing disc 22). According to the direction of rotation of the mowing disc 22, the angle 97 is arranged relative to the mowing blade 24 to the left or right side with respect to the mowing blade 24.

On a top side 98 of the fastening plate 82 there are bulges 100 that extend, in the mounted state of the scraper 80, laterally along a bulge formed on the bottom side of the mowing disc 22 (a bulge extending in the direction of the spring plate 32; not shown) and form an adaptation for the scraper 80.

On an end 102 of the fastening plate 80 facing the bearing pin 28 there is a curved pocket 104 extending around the bearing pin 28, with a section 106 adjacent to each of the curve ends 105. The sections 106 in connection with the curve ends 105 act as an attachment fit for a clamping tool 108 that can be attached for changing the mowing blade 22, which can be seen in FIG. 7.

The clamping tool 108 has a lever arm 110 or handle with a fork head 112, wherein two parallel, spaced-apart fork legs 114 are formed on the fork head 112, and these legs can be placed or pushed between the mowing disc 22 and spring plate 32. Simultaneously, the clamping tool 108 can be brought into engagement with the pockets 106 of the scraper. The fork legs 114 of the lever arm 110 are arranged at a distance to each other just like the pockets 106 constructed on the fastening plate 82 or also like the curve ends 105 of the curved pocket 104 are spaced apart from each other. Now if the clamping tool 108 is mounted, that is, if the fork legs 114 are each pushed on one side of the mowing blade 24 between the mowing disc 22 and the spring plate 32, then the pockets 106 can be used, on one hand, as a stop for the fork leg ends 116, and, on the other hand, in connection with the curve ends 105 of the curved pocket 106 as a lateral guide of the fork legs 114 against lateral slippage.

Figure 7:
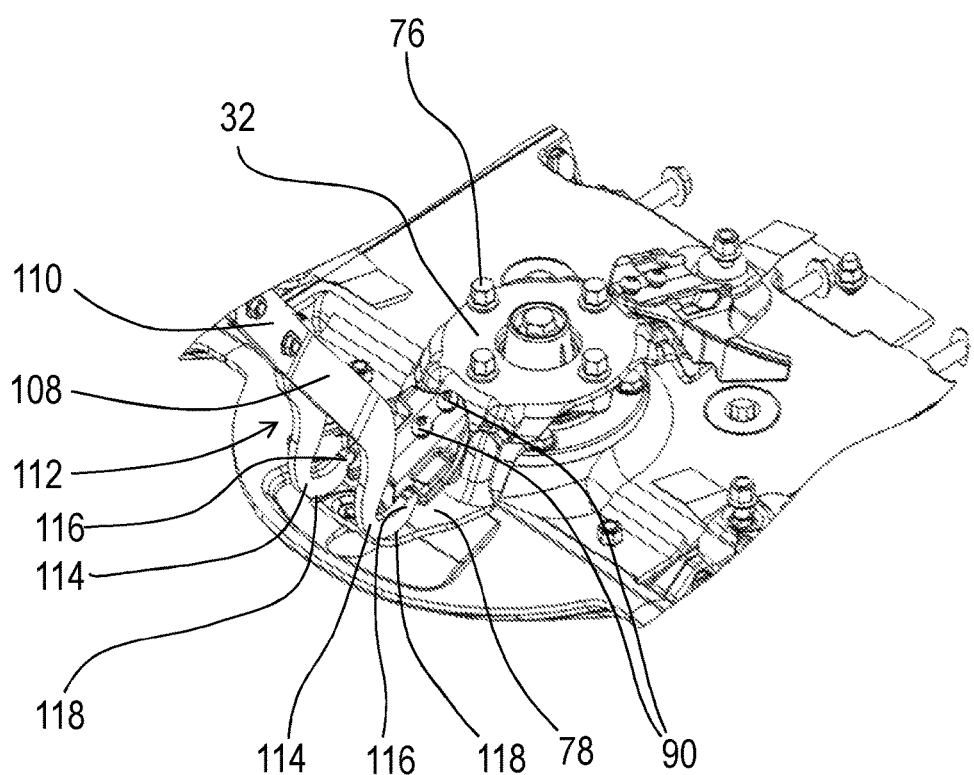

The fork legs 114 are constructed with a curved shape with respect to a horizontally oriented lever arm 110 with fork leg ends 116 pointing essentially in the vertical direction, so that, when the clamping tool 108 is mounted between the mowing disc 22 and the spring plate 32 of the blade rotor 20 and brought into engagement with the pockets 106, a downward movement of the lever arm 110 presses the fork leg ends 118 against the bottom side of the mowing disc 22, and the fork legs 114 simultaneously press the spring plate 32 downward. The fork legs 114 are, in other words, bent upward with respect to a horizontally oriented lever arm 110, so that when the clamping tool 108 is mounted and the fork legs 114 contact the spring plate 32, as shown in FIG. 7, moving the lever arm 110 down presses the fork leg ends 116 against the bottom side of the mowing disc 22 and simultaneously moves (levers) a fork leg contact surface 118 in the direction of the spring plate 32. In this way, the distance between the mowing disc 22 and spring plate 32 is increased until the mowing blade 24 is released from the bearing pin 28 or from the holding hole 34 constructed on the spring plate 32 and can be replaced.

The invention claimed is:

1. A blade rotor of a cutter bar of a mowing device, comprising:
   a mowing disc positioned above the cutter bar;
   at least one mowing blade;
   at least one beating pin mounted on the mowing disc for the pivoting support of the mowing blade;
   a spring plate arranged on a bottom side of the mowing disc and in contact with the bearing pin for holding the mowing blade on the bearing pin between the spring plate and the mowing disc, the spring plate and mowing disc coupled to rotate together about an axis of rotation; and
   at least one scraper for removing residue stuck on a top surface of the cutter bar, wherein the scraper is arranged between a top side of the spring plate and the bottom side of the mowing disc and is mounted detachably on the mowing disc between the bearing pin and the axis of rotation of the mowing disc.

2. The blade rotor of claim 1, wherein the scraper comprises a fastening plate and a scraper finger extending from there essentially radial to the axis of rotation of the mowing disc and parallel to the surface of the cutter bar with a scraping edge, so that the scraping edge of the scraper finger traverses a circular ring-shaped surface when the mowing disc rotates.

3. The blade rotor of claim 2, wherein the radial extent of the scraping finger is in the plane of rotation of the mowing blade at an angle offset relative to the mowing blade.

4. The blade rotor of claim 2, wherein the scraper can be mounted by means of a threaded connection accessible from the top side of the mowing disc, wherein there is at least one threaded bolt that extends through a passage hole formed in the mowing disc and that can be connected to the fastening plate of the scraper.

5. The blade rotor of claim 2, wherein pockets are provided on the fastening plate on both sides of the bearing pin, wherein these pockets form an attachment fit for a clamping tool that can be attached for exchanging the mowing blade.

6. A mowing device with a cutter bar, comprising:
   at least one blade rotor including a mowing disc positioned above the cutter bar;
   at least one mowing blade;
   at least one beating pin mounted on the mowing disc for the pivoting support of the mowing blade;
   a spring plate arranged on a bottom side of the mowing disc and in contact with the bearing pin for holding the mowing blade on the bearing pin between the spring plate and the mowing disc, the spring plate and mowing disc coupled to rotate together about an axis of rotation; and
   at least one scraper for removing residue stuck on a top surface of the cutter bar, wherein the scraper is arranged between a top side of the spring plate and the bottom side of the mowing disc and is mounted detachably on the mowing disc between the bearing pin and the axis of rotation of the mowing disc.

7. The mowing device of claim 6, wherein the scraper comprises a fastening plate and a scraper finger extending from there essentially radial to the axis of rotation of the mowing disc and parallel to the surface of the cutter bar with a scraping edge, so that the scraping edge of the scraper finger traverses a circular ring-shaped surface when the mowing disc rotates.

8. The mowing device of claim 7, wherein the radial extent of the scraping finger is in the plane of rotation of the mowing blade at an angle offset relative to the mowing blade.

9. The mowing device of claim 7, wherein the scraper can be mounted by means of a threaded connection accessible from the top side of the mowing disc, wherein there is at least one threaded bolt that extends through a passage hole formed in the mowing disc and that can be connected to the fastening plate of the scraper.

10. The mowing device of claim 7, wherein pockets are provided on the fastening plate on both sides of the bearing pin, wherein these pockets form an attachment fit for a clamping tool that can be attached for exchanging the mowing blade.

* * * * *